(12) United States Patent
Gami et al.

(10) Patent No.: US 9,133,802 B2
(45) Date of Patent: Sep. 15, 2015

(54) DEVICE FOR SEALING ORIFICES ON NOZZLE OF FUEL INJECTOR FOR AUTOFRETTAGE PROCESS

(71) Applicant: Caterpillar Inc., Peoria, IL (US)

(72) Inventors: Rahul N. Gami, Dunlap, IL (US); Marion B. Grant, Princeville, IL (US); John S. Miller, Jr., Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 100 days.

(21) Appl. No.: 13/890,652

(22) Filed: May 9, 2013

(65) Prior Publication Data
US 2014/0331729 A1    Nov. 13, 2014

(51) Int. Cl.
*B21K 21/08*   (2006.01)
*F02M 61/16*   (2006.01)
*B23P 17/00*   (2006.01)
*B23P 9/00*    (2006.01)

(52) U.S. Cl.
CPC .............. *F02M 61/168* (2013.01); *B21K 21/08* (2013.01); *B23P 9/00* (2013.01); *B23P 17/00* (2013.01)

(58) Field of Classification Search
CPC ......... F02M 61/168; B23P 9/00; B23P 17/00; B21K 21/08

USPC .......... 72/54, 56, 379.2, 412–413; 29/890.06, 29/890.142, 890.143, 421.1
See application file for complete search history.

(56) References Cited

U.S. PATENT DOCUMENTS

| | | | | |
|---|---|---|---|---|
| 2,861,483 | A | * | 11/1958 | Dosen ................................ 72/70 |
| 5,607,109 | A | * | 3/1997 | Von Berg ....................... 239/568 |
| 6,105,411 | A | * | 8/2000 | Moriya ............................... 72/75 |
| 8,381,402 | B2 | * | 2/2013 | Grant et al. .............. 29/890.142 |
| 2010/0154501 | A1 | | 6/2010 | Kampmann et al. |
| 2011/0126393 | A1 | | 6/2011 | Grant et al. |
| 2011/0315793 | A1 | | 12/2011 | Michlik et al. |

FOREIGN PATENT DOCUMENTS

| | | |
|---|---|---|
| DE | 102011000121 | 9/2011 |
| EP | 1298313 | 4/2003 |
| EP | 2510128 | 10/2012 |
| JP | 2009052452 | 3/2009 |
| JP | 2012184717 | 9/2012 |

\* cited by examiner

*Primary Examiner* — David B Jones
(74) *Attorney, Agent, or Firm* — Finnegan, Henderson, Farabow, Garrett & Dunner, LLP (57) ABSTRACT

A device for sealing one or more orifices on a vessel for pressurizing fluid is provided. The device includes an outer surface and an inner surface. The inner surface includes one or more substantially semi-spherical protrusions corresponding to the orifices. The protrusions are configured to contact with edges of the orifices and seal the orifices.

18 Claims, 7 Drawing Sheets

DEVICE FOR SEALING ORIFICES ON NOZZLE OF FUEL INJECTOR FOR AUTOFRETTAGE PROCESS

TECHNICAL FIELD

The present disclosure relates to a device for sealing orifices on a vessel, and more particularly to a device for sealing orifices on a nozzle of a fuel injector for an autofrettage process.

BACKGROUND

Ever more stringent emissions regulations have driven the compression ignition engine industry to adopt increased fuel injection pressures. One area of concern as a consequence of increased injection pressures relates to potential fatigue in the sac region of the fuel injector nozzle tip component. The sac region is often the thinnest pressure containment metallic layer, and also defines the nozzle outlets that extend between an interior volume of the fuel injector to the combustion space of the engine. The sac region will typically cycle through extreme high pressures with each engine cycle.

One strategy believed to have promise in strengthening fuel system components is to induce compressive residual stress on the inner surface the component. While a number of different strategies are possible for inducing compressive residual stress, an autofrettage process can be effective in inducing compressive residual stress on the interior surfaces of pressure vessels. An Autofrettage process typically involves subjecting an inside of the vessel to a large fluid pressure so that residual compressive stresses are introduced on the inside of the vessel. To accomplish autofrettage in a high pressure vessel having one or more orifices, the orifices may be sealed prior to application of fluid pressure on the inside of the vessel. U.S. Publication No. 2011/0126393 relates to a production robust autofrettage process for strengthening fuel injector nozzle tips. The process includes applying a vacuum to the interior volume of the nozzle tip. Plugs are suctioned over each of the nozzle outlets. Nozzle outlets are blocked by pressing the plugs between the nozzle tip and a fixture component. The nozzle tip is then autofrettaged at least in part by pressurizing the interior volume with an autofrettage liquid. The plugs are then removed from the nozzle outlets leaving the nozzle tip strengthened with compressive residual stress.

SUMMARY

In one aspect, the present disclosure provides a device for sealing one or more orifices on a vessel for pressurizing fluid. The device includes an outer surface and an inner surface. The inner surface includes one or more substantially semi-spherical protrusions corresponding to the orifices. The protrusions are configured to contact with edges of the orifices, and seal the orifices.

In another aspect, the present disclosure provides a device for sealing one or more orifices on a vessel for pressurizing fluid. The device includes an outer surface and an inner surface. The inner surface includes one or more substantially semi-cylindrical protrusions corresponding to the orifices. The protrusions are configured to contact with edges of the orifices, and seal the orifices.

In another aspect, the present disclosure provides a method of sealing one or more orifices on a vessel for pressurizing fluid. The method includes positioning an outer surface of a device to rest on an autofrettage tool. The method includes positioning an inner surface of the device to face the vessel. The method includes positioning one or more protrusions disposed on the inner surface to align with the orifices. The method includes contacting the protrusions with edges of the orifices. The method includes plastically deforming the protrusions through a force from the autofrettage tool on the outer surface. The method includes sealing the orifices.

DETAILED DESCRIPTION

Reference will now be made in detail to specific embodiments or features, examples of which are illustrated in the accompanying drawings. Generally, corresponding or similar reference numbers will be used, when possible, to refer to the same or corresponding parts.

Autofrettage processes may introduce residual compressive stress to an inside surface of a component, and is known to be used in the production of high pressure fuel injectors, fuel lines, and other hydraulic and mechanical systems that are typically subjected to large internal fluctuating pressures. Autofrettaging involves pressurizing the component past the yield strength of the interior material, but below the yield strength for the material closer to the outside diameter of the component. One challenge in such a high pressure hydraulic process is sealing effectively.

Figure 1:
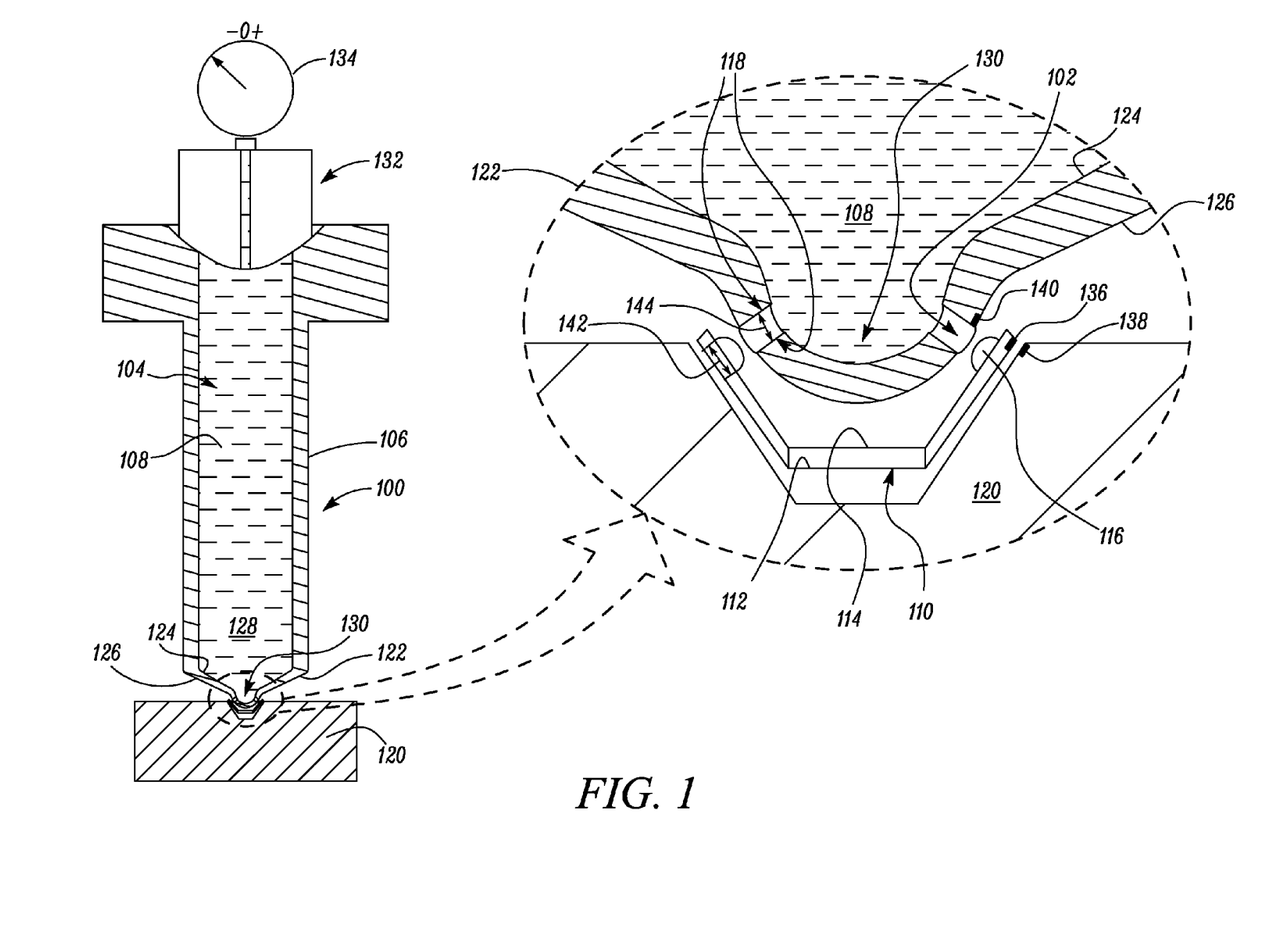
FIGS. 1-2 illustrate a sectional view of a device employed in autofrettaging a vessel.
Figure 2:
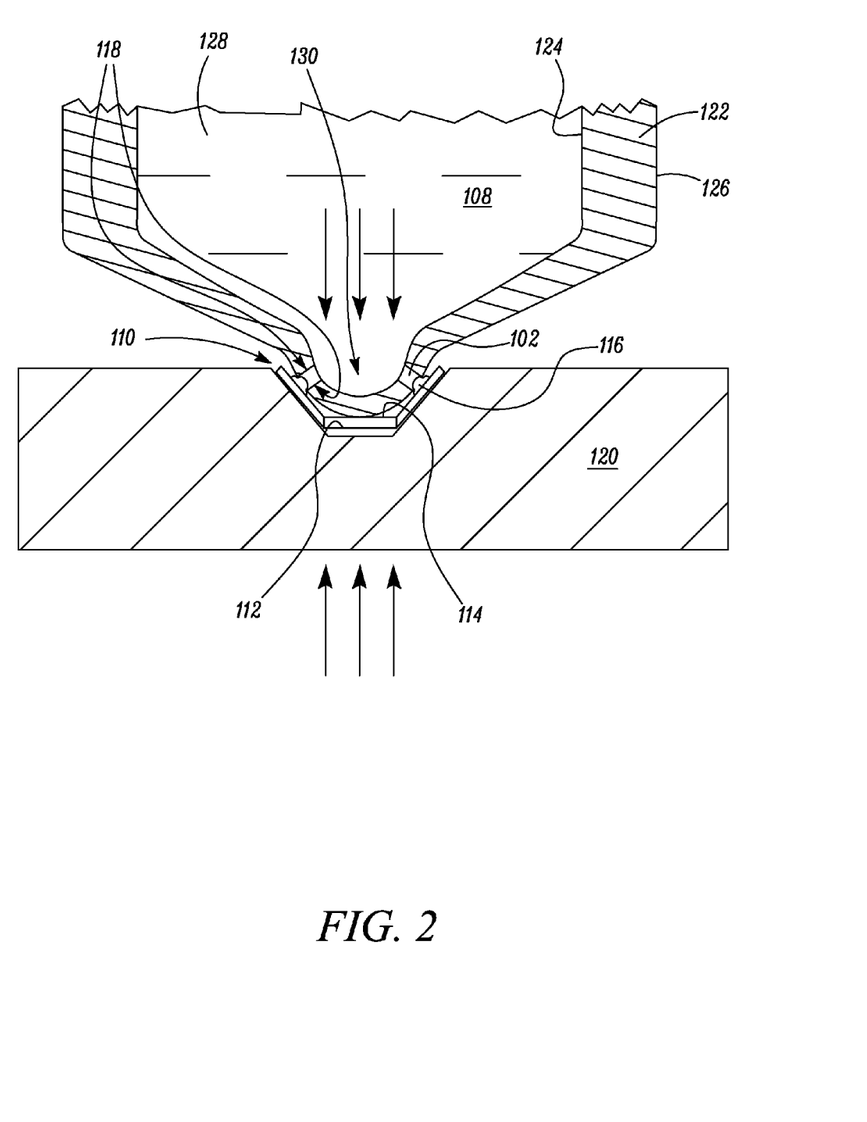

Referring now to FIGS. 1 and 2, a vessel 100 including at least one orifice 102 is illustrated in an autofrettage process. The vessel 100 is configured for use in pressurizing a fluid 104. In the embodiment illustrated, the vessel 100 includes a fuel injector 106, and the fluid 104 includes an autofrettage liquid 108. Also illustrated is a device 110 for sealing one or more orifices 102 on the vessel 100 when the vessel 100 is used to pressurize the fluid 104. The device 110 includes an outer surface 112 and an inner surface 114. The inner surface 114 includes one or more protrusions 116. In the embodiment illustrated, the protrusions 116 include a substantially semi-spherical shape and are located on the device 110 in a pattern corresponding to the pattern of the orifices 102 on the vessel 100. The protrusions 116 may be located on the device 110 in a manner configured to seal the orifices 102 when pressed into contact with edges 118 of the orifices 102. The device 110 is described in more detail in relation to FIGS. 3-8. In the embodiment illustrated, the outer surface 112 of the device 110 is configured to rest on an autofrettage tool 120 while the inner surface 114 of the device 110 is configured to face the vessel 100 containing orifices 102. The outer surface 112 includes a profile conjugate to a profile of the autofrettage tool 120 thus allowing the outer surface 112 of the device 110 to rest on the autofrettage tool 120. The device 110 may be used in embodiments other than autofrettaging, where sealing of the orifices 102 on the vessel 100 is desired. For example, the device may be used to seal the orifices 102 on the vessel 100 during a high pressure test where the fluid 104 is pressurized in the vessel 100.

In the embodiment illustrated, the fuel injector 106 includes a nozzle 122. The nozzle 122 includes an interior surface 124 and an exterior surface 126. The nozzle 122 defines orifices 102 through which fuel may be injected into an engine combustion chamber (not shown). The protrusions 116 are configured to seal the orifices 102 on the nozzle 122. The orifices 102 extend from the interior surface 124 to the exterior surface 126 of the nozzle 122. The nozzle 122 defines an interior volume 128 including a sac region 130. In the embodiment illustrated, the nozzle 122 is shown with an attached pressure component 132 configured to supply pressurized fluid within the interior volume 128 of the nozzle 122. Further, a pressure gauge 134 is illustrated, coupled to the pressure component 132, and configured to measure the fluid pressure within the interior volume 128 of the nozzle 122.

In the illustrated embodiment, the device 110 may include an indicia 136 configured to align with a timing mark 138 on the autofrettage tool 120. The indicia 136 is located such that when the indicia 136 is aligned with the timing mark 138 on the autofrettage tool 120, the protrusions 116 on the inner surface 114 align to the orifices 102 on the nozzle 122. The location of the orifices 102 on the nozzle 122 may be known to a manufacturer. Correspondingly, the manufacturer may locate the protrusions 116, the indicia 136, and the timing mark 138 such that when the indicia 136 are aligned to the timing mark 138, the protrusions 116 align to the orifices 102.

In alternative embodiments, the indicia 136 may be configured to align with a timing mark 140 on the nozzle 122, or with timing marks 140, 138, on the nozzle 122 and the autofrettage tool 120. In other embodiments, other methods of aligning the protrusions 116 with the orifices 102 may be used as would be known by an ordinary person skilled in the art.

In the illustrated embodiment, a diameter 142 of the protrusions 116 is greater than a diameter 144 of the orifices 102. In alternative embodiments, where the protrusions 116 include alternative shapes, dimensions of the protrusions may be selected such that when pressed against the orifices 102, the protrusions 116 seal the vessel 100 to block a flow of the fluid 104 out of the vessel 100 through the orifices 102, as would be known by an ordinary person skilled in the art.

In the embodiment illustrated, the protrusions 116 are configured to contact the edges 118 of the orifices 102. As illustrated in FIG. 2, upon contact of the protrusions 116 with the edges 118 of the orifices 102, the autofrettage tool 120 may apply a force on the outer surface 112 of the device 110 such that the protrusions 116 are biased towards the orifices 102. Further application of force on the outer surface 112 may plastically deform the protrusions 116 at the edges 118 of the orifices 102 and seal the orifices 102. The autofrettage process may then proceed by pressurizing an interior volume 128 of the nozzle 122 by the pressure component 132 using the autofrettage liquid 108. Upon completion of the autofrettage process, the device 110 may be withdrawn from the nozzle 122 such that the deformed protrusions 116 are withdrawn from the respective orifices 102.

The protrusions 116 may include a protrusion material, and the nozzle 122 may include a nozzle material. The protrusion material may be softer than the nozzle material such that the protrusions 116 plastically deform upon being forced against the edges 118 of the orifices 102 by the autofrettage tool 120. In one example, the nozzle 122 may include heat treated tool steel having a Rockwell hardness of 55 RC and the protrusions 116 may include stainless steel having a Rockwell hardness of 30 RC allowing the stainless steel protrusions 116 to plastically deform upon application of force from the autofrettage tool 120.

Figure 3:
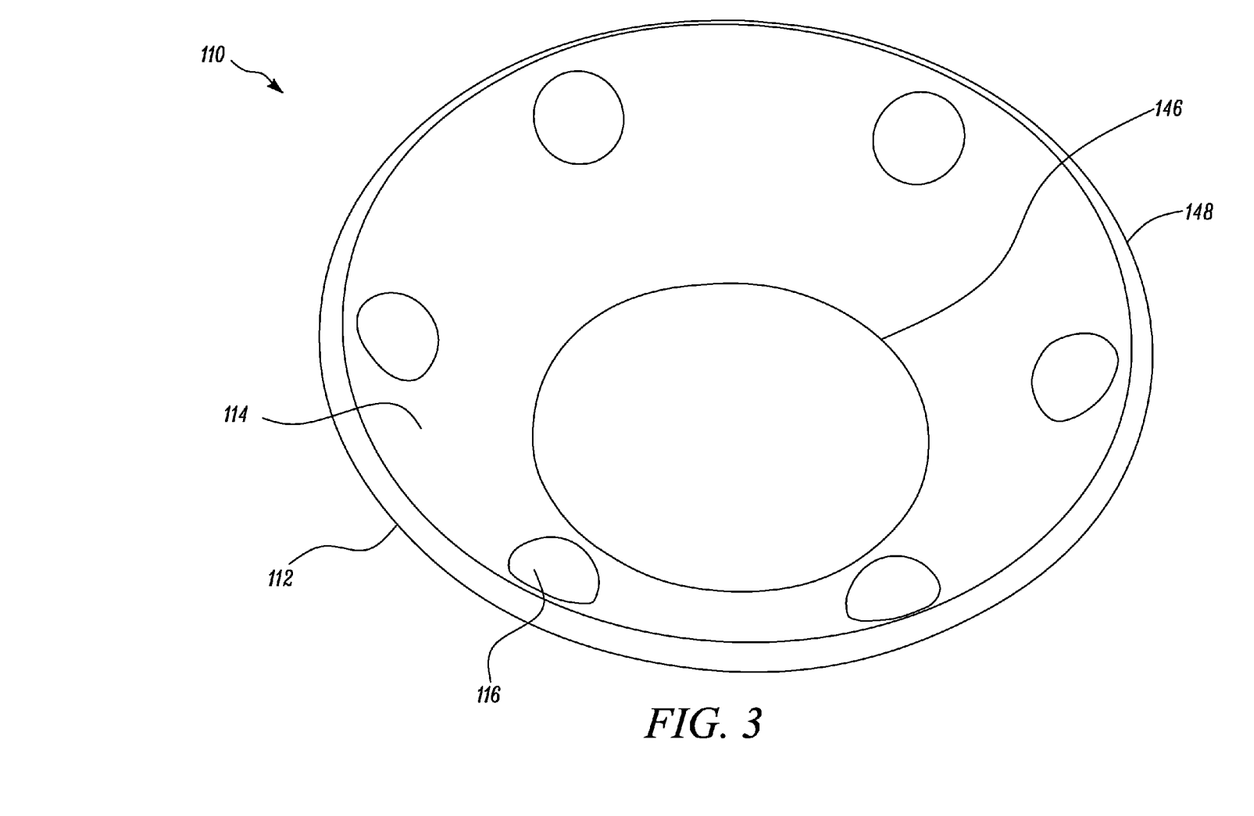
FIG. 3 illustrates a perspective view of an embodiment of the device including protrusions having a substantially semi-spherical shape.

Referring now to FIG. 3, a perspective view of an embodiment of the device 110 is illustrated. In the embodiment of FIG. 3, the protrusions 116 include a substantially semi-spherical shape. In alternative embodiments, the protrusions 116 may include any shape operable to seal the orifices 102 on the vessel 100. In some embodiments, all of the protrusions 116 may include similar shapes. In alternative embodiments, some of the protrusions 116 may include one shape while the other protrusions 116 may include other shapes. In the embodiment illustrated, the device 110 may include a frustum-shape defining an inner periphery 146 and an outer periphery 148.

Figure 4:
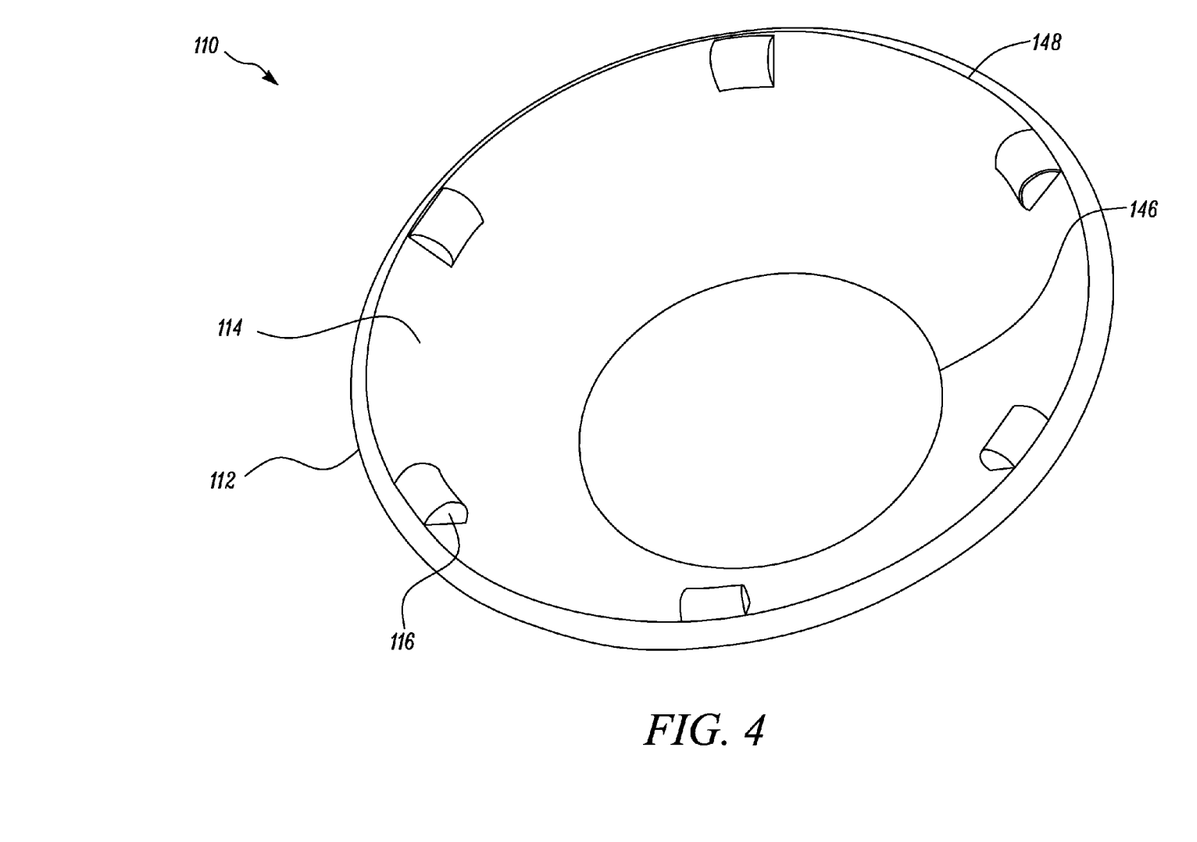
FIG. 4 illustrates a perspective view of an embodiment of the device including protrusions having a substantially semi-cylindrical shape.

Referring now to FIGS. 4-8, exemplary non-limiting alternative embodiments of device 110 are illustrated. In FIG. 4, an embodiment of device 110 includes protrusions 116 having a substantially semi-cylindrical shape.

Figure 5:
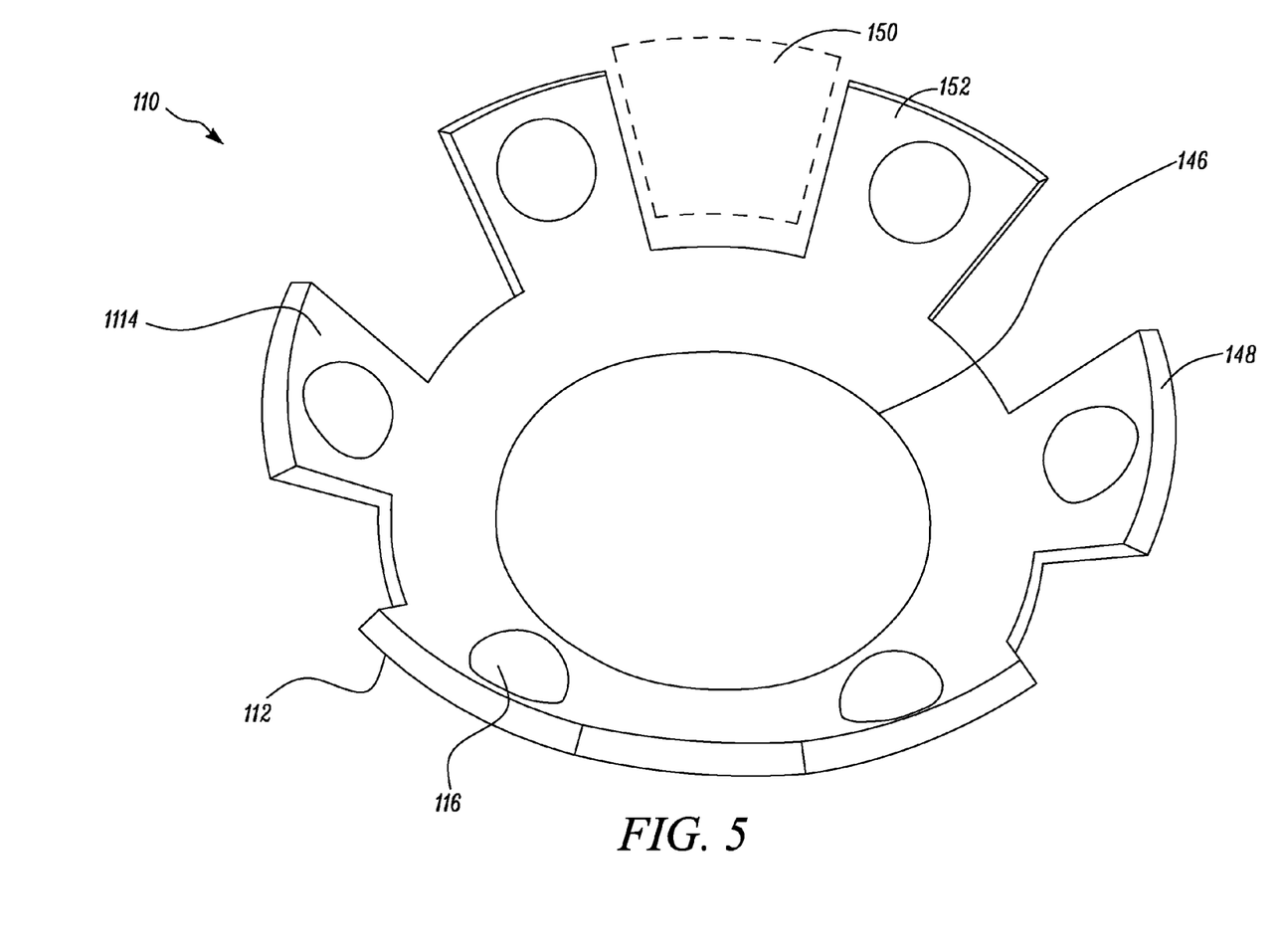
FIG. 5 illustrates perspective view of an alternative embodiment of the device.

In FIG. 5, portions 150 of interstitial areas 152 between adjacent protrusions 116 are removed from the alternative embodiment of device 110 illustrated, giving a toothed appearance and form to the device 110. In other embodiments, the device 110 may include other shapes depending on a specific sealing application of the device 110.

Figure 6:
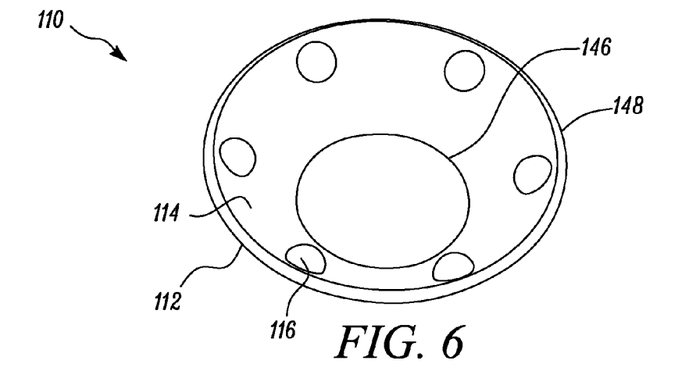
FIG. 6 illustrates a perspective view of an embodiment of the device showing protrusions disposed substantially close to an outer periphery of the device.

In FIG. 6, the protrusions 116 are disposed substantially close to the outer periphery 148 of the alternative embodiment of device 110 illustrated.

Figure 7:
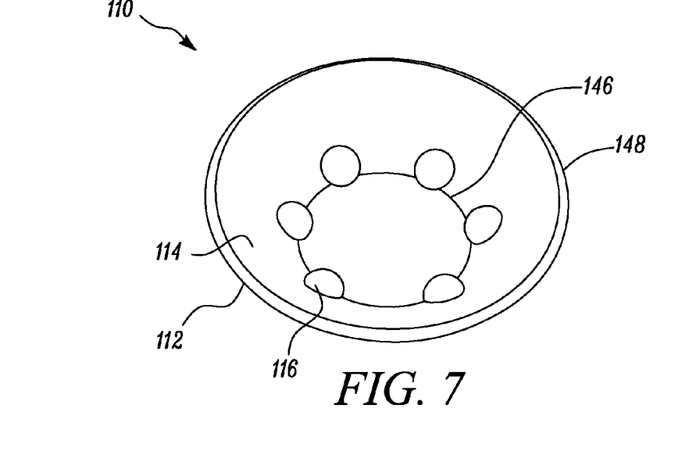
FIG. 7 illustrates a perspective view of an embodiment of the device showing protrusions disposed substantially close to an inner periphery of the device.

In FIG. 7, the protrusions 116 are disposed substantially close to the inner periphery 146 in the alternative embodiment of device 110 illustrated.

Figure 8:
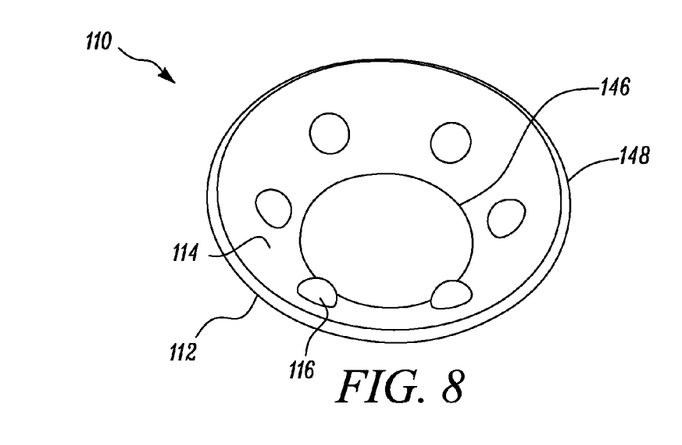
FIG. 8 illustrates a perspective view of an embodiment of the device showing protrusions disposed substantially between the inner periphery and outer periphery of the device.

In FIG. 8, the protrusions 116 are disposed substantially between the inner periphery 146 and outer periphery 148 of the frustum shaped alternative embodiment of device 110.

In FIGS. 6-8, the protrusions 116 are radially and equidistantly arranged on the inner surface 114 in the alternative embodiments of device 110 illustrated. In other alternative embodiments, the device 110 may include other arrangements of the protrusions 116 on the inner surface 114 as would be known by an ordinary person skilled in the art.

INDUSTRIAL APPLICABILITY

Figure 9:
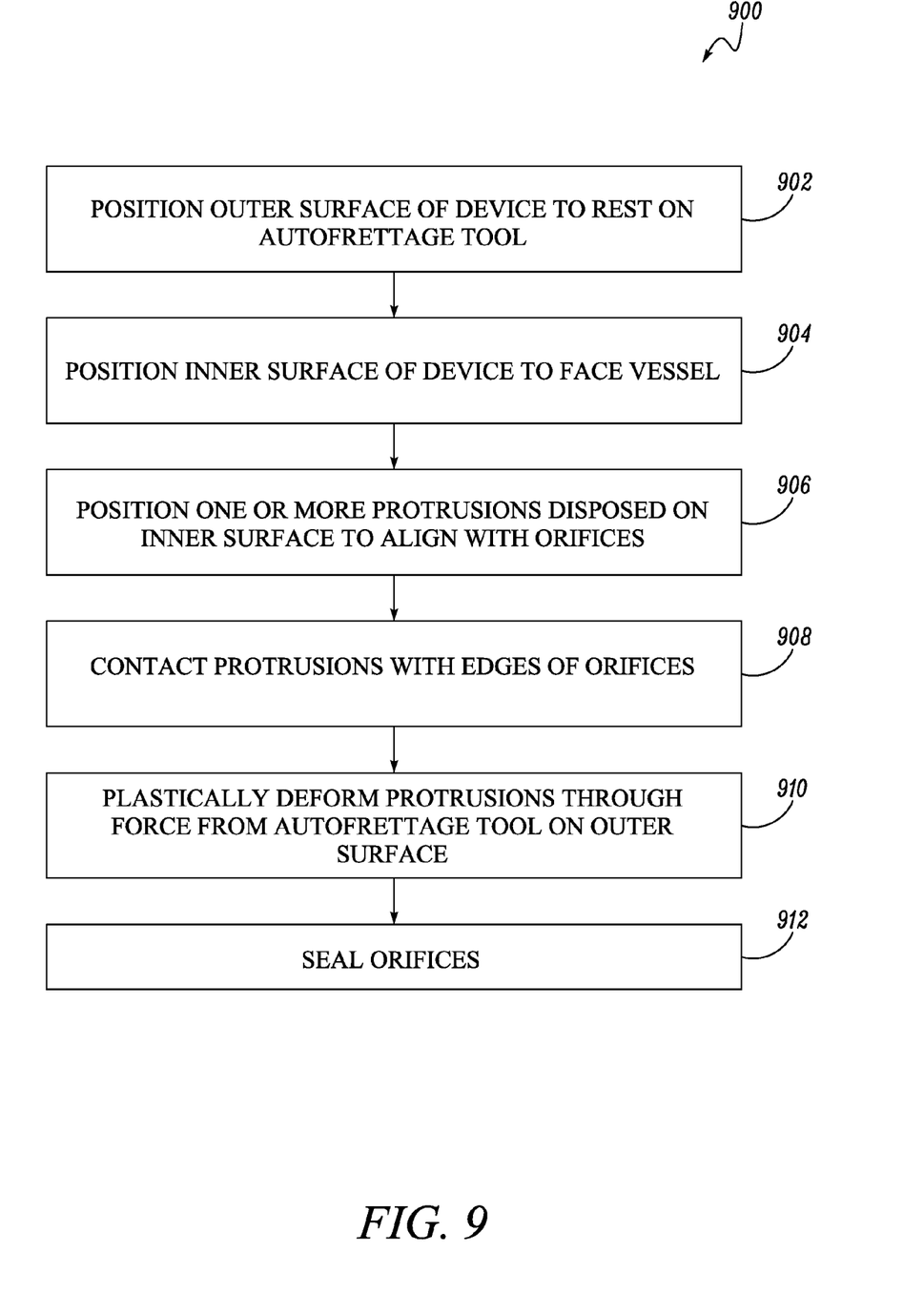
FIG. 9 is a method of sealing the orifices on the vessel for pressurizing fluid.

FIG. 9 illustrates a method 900 of sealing the orifices 102 on the vessel 100 for pressurizing fluid. At step 902, the method 900 includes positioning the outer surface 112 of the device 110 to rest on the autofrettage tool 120. At step 904, the method 900 includes positioning the inner surface 114 of the device 110 to face the vessel 100. At step 906, the method 900 includes positioning the protrusions 116 to align with the orifices 102. At step 908, the method 900 includes contacting the protrusions 116 with edges 118 of the orifices 102. At step 910, the method 900 includes plastically deforming the protrusions 116 through a force from the autofrettage tool 120 on the outer surface 112. At step 912, the method 900 includes sealing the orifices 102.

In an embodiment, the method 900 is employed in autofrettaging a fuel injector 106 including a nozzle 122 having orifices 102 thereon. In one embodiment, aligning the protrusions 116 on the inner surface 114 with the orifices 102 includes aligning the indicia 136 on the device 110 with the timing mark 138 on the autofrettage tool 120. In another embodiment, aligning the protrusions 116 on the inner surface 114 with the orifices 102 includes aligning the indicia 136 on the device 116 with the timing mark 140 on the nozzle 122.

In one known method of autofrettaging, orifices on high pressure vessels have been sealed with tiny individual spheres sucked onto edges of the orifices using vacuum suction processes. In some cases, more than one sphere may be sucked onto each orifice leading to partial or no sealing of the orifice. Therefore, these processes for sealing the orifices may require close monitoring of the spheres to ensure that a single sphere aligns with a single orifice.

With the device 110 of the present disclosure, the protrusions 116 configured to seal the orifices 102 are integrated with the inner surface 114. The number of protrusions 116 may be selected such that the protrusions 116 correspond to the orifices 102 on the vessel 100 and the locations of the protrusions 116 may be selected to correspond to the location of the orifices 102 on the vessel 100 such that each one of the protrusions 116 seals each one of the orifices 102 on the vessel 100.

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

We claim:

1. A device for sealing one or more orifices on a vessel for pressurizing fluid, the device comprising:
    an outer surface;
    an inner surface disposed opposite the outer surface and configured to face the vessel, the inner surface including:
        one or more substantially semi-spherical protrusions located on the inner surface and configured to correspond to the orifices, to contact with edges of the orifices, and to seal the orifices; and
    wherein the device is frustum-shaped defining an inner periphery and an outer periphery.

2. The device of claim 1, wherein the one or more substantially semi-spherical protrusions are configured to seal orifices on a nozzle of a fuel injector.

3. The device of claim 1, wherein the outer surface of the device is configured to rest on an autofrettage tool during an autofrettage process.

4. The device of claim 3, wherein a profile of the outer surface is conjugate to a profile on the autofrettage tool such that the outer surface is configured to rest on the autofrettage tool and dispose the inner surface to face the vessel.

5. The device of claim 1, wherein the one or more substantially semi-spherical protrusions are disposed at one of substantially close to the inner periphery, substantially close to the outer periphery, and substantially between the inner and outer peripheries.

6. The device of claim 2, wherein one or more of the outer surface and the inner surface includes an indicia configured to align with a timing mark on one of an autofrettage tool and the vessel to align the one or more substantially semi-spherical protrusions with the orifices on the vessel.

7. The device of claim 2, wherein a material of the protrusions is softer than a material of the vessel such that the protrusions plastically deform upon being forced against the edges of the orifices by an autofrettage tool.

8. The device of claim 1, wherein a diameter of the one or more substantially semi-spherical protrusions is greater than a diameter of the orifices.

9. A device for sealing one or more orifices on a vessel for pressurizing fluid, the device comprising:
    an outer surface;
    an inner surface disposed opposite the outer surface and configured to face the vessel, the inner surface including:
        one or more substantially semi-cylindrical protrusions located on the inner surface and configured to correspond to the orifices, to contact with edges of the orifices, and to seal the orifices and
    wherein the device is frustum-shaped defining an inner periphery and an outer periphery.

10. The device of claim 9, wherein the one or more substantially semi-cylindrical protrusions are configured to seal orifices on a nozzle of a fuel injector.

11. The device of claim 9, wherein the outer surface of the device is configured to rest on an autofrettage tool during an autofrettage process.

12. The device of claim 11, wherein a profile of the outer surface is conjugate to a profile on the autofrettage tool such that the outer surface is configured to rest on the autofrettage tool and dispose the inner surface to face the vessel.

13. The device of claim 9, wherein the one or more substantially semi-cylindrical protrusions are disposed at one of substantially close to the inner periphery, substantially close to the outer periphery, and substantially between the inner and outer peripheries.

14. The device of claim 10, wherein one or more of the outer surface and the inner surface includes an indicia configured to align with a timing mark on one of an autofrettage tool and the vessel to align the one or more substantially semi-spherical protrusions with the orifices on the vessel.

15. The device of claim 10, wherein a material of the protrusions is softer than a material of the vessel such that the protrusions plastically deform upon being forced against the edges of the orifices by an autofrettage tool.

16. The device of claim 9, wherein a diameter of the one or more substantially semi-cylindrical protrusions is greater than a diameter of the orifices.

17. A method of sealing one or more orifices on a vessel for pressurizing fluid, the method comprising:
    positioning an outer surface or a device to rest on an autofrettage tool;
    positioning an inner surface of the device to face the vessel;
    positioning one or more protrusions disposed on the inner surface to align with the orifices;
    contacting the protrusions with edges of the orifices;
    plastically deforming the protrusions through a force from the autofrettage tool on the outer surface; and
    sealing the orifices.

18. The method of claim 17, wherein the method is employed in autofrettaging a fuel injector including a nozzle having orifices thereon, wherein at least one indicia on one or more of the inner surface, and the outer surface of the device is aligned with a timing mark on one or more of the autofrettage tool, and the nozzle to align the protrusions to the orifices.

* * * * *